United States Patent Office 2,975,130
Patented Mar. 14, 1961

2,975,130

WATER-RESISTANT NON-SOAP GREASES CONTAINING ALKYL ARYL POLYETHER ALCOHOLS AND METHODS OF PREPARING THE SAME

Ralph A. Potter, Fullerton, Calif., assignor to Union Oil Company of California, Los Angeles, Calif., a corporation of California No Drawing. Filed Mar. 11, 1957, Ser. No. 644,981

17 Claims. (Cl. 252—28)

This invention relates to water-resistant non-soap greases. More particularly this invention relates to water-resistant greases thickened with finely divided silica and/or alumina to which an alkyl aryl polyether alcohol is added to impart such water resistance.

Lubricating greases having valuable characteristics have been prepared using as thickening agents finely divided silica and/or alumina in the form of silica or alumina aerogels or in the form of colloidal silica or alumina. Greases prepared in this manner, although having many characteristics making them desirable lubricants for many purposes are deficient in certain characteristics. Thus they are not water resistant and their reversibility characteristics on heating and cooling and on working are not all that is desired.

Powdered thickening agents of the types indicated have been improved for use in preparing greases and fair water resistance has been obtained by treating the powdered materials prior to their use in greases with various agents which are found to react with and/or coat the particles to improve their water resistance characteristics. Thus, such materials, which are initially hydrophilic, have treated with alcohols under certain conditions which treatment tends to make them hydrophobic. Moreover, such powdered materials have been treated with alkyd resins and the like which also appears to improve their water resistance. Such treatments, however, are costly, making greases prepared from these treated materials costly.

It is now found that water-resistant greases can be prepared using the untreated powdered silica and/or alumina thickening agents by adding an alkyl aryl polyether alcohol to the lubricating oil to which the powdered materials are subsequently added or by first adding the powdered materials to the lubricating oils to produce greases and then adding the alkyl aryl polyether alcohols, and in either case, heating the resulting greases to a temperature sufficient to eliminate moisture from the system, i.e., temperatures above about 250° F. The resulting greases are not only water resistant but they have good reversibility characteristics and are otherwise entirely satisfactory for use in most grease applications.

It is an object of this invention to produce water-resistant non-soap greases.

A further object of this invention is to produce water-resistant greases having good reversibility characteristics.

Another object of this invention is to provide a relatively simple and inexpensive method of producing non-soap greases having exceptional water resistance and good reversibility characteristics.

It is a more particular object of this invention to produce water-resistant greases thickened with finely divided silica and/or alumina in which the water resistance is imparted by incorporating in the grease relatively small amounts of certain alkyl aryl polyether alcohols.

The above and related objects are accomplished by incorporating in a lubricating oil sufficient finely-divided silica and/or alumina to produce the desired degree of thickening, adding to the resultant thickened oil small amounts of a preferentially oil-soluble alkyl aryl polyether alcohol and heating the composition to a minimum temperature of 250° F. and preferably to a temperature of 300–325° F. and then cooling the grease. As an alternative method, to the lubricating oil which is to be used in preparing the grease, is added small amounts of the alkyl aryl polyether alcohol and to the oil containing this additive material is then added the desired amount of finely divided silica and/or alumina to produce the desired degree of thickening, and the product is mixed with paddle agitation or by milling and subsequently heated to a temperature of at least 250° F. and preferably to at least 300–325° F., as above indicated.

Powdered or finely divided silicas and aluminas, which are to be used, are available on the market and are known in the trade as silica and alumina aerogels or as colloidal silica or alumina. For example, particularly satisfactory colloidal silica having a particle size of 0.015–0.02 micron and a specific surface area of 175–200 square meters per gram is available under the name of Cab-O-Sil from Godfrey L. Cabot, Inc. of Boston, Massachusetts. The silica and alumina aerogels which are available from various sources are also of extremely small particles size and are entirely satisfactory for producing the greases of this invention. Silica aerogels for example are obtainable from Monsanto Chemical Company under the name of Santocel. Santocel C is a silica aerogel having a specific surface area of approximately 157 square meters per gram.

In order to obtain best results the powdered silicas and aluminas to be used will have particle sizes in the range of from about 0.001 micron to about 1 micron. Preferably the particles will be less than about 0.5 micron and the average particle size will be between 0.005 and 0.1 micron. The specific surface area of the powdered thickening agent should be greater than 10 square meters per gram and will preferably be between about 25 and about 500 square meters per gram. The electron microscope is used to determine particle sizes and the specific surface area is determined by the nitrogen absorption method as described in the publication symposium on new methods for particle size determination in the Sub-Sieve Range, American Society for Testing Materials, March 4, 1941, page 95, in an article "A New Method for Measuring the Surface Areas of Finely Divided Materials and for Determining the Size of Particles" by P. H. Emmett.

Although the description herein relates to both silica and alumina in finely divided form it is to be noted that the silicas are preferred for producing the greases of this invention. Greases produced using silica are somewhat superior to those prepared with alumina with respect to water resistance when the same proportions of waterproofing agents are employed.

Alkyl aryl polyether alcohols which are useful in imparting water resistance and reversibility to greases thickened with the above non-soap thickeners include those compounds prepared by reacting an alkyl-substituted phenol with ethylene oxide. The alkyl substituent or substituents of the phenol will contain a total of 6–18 carbon atoms. The amount of ethylene oxide to be reacted with the phenol will vary depending upon the carbon atom content of the alkyl group or groups attached to the phenol. Generally the reacting ratio of ethylene oxide to phenol will be between 2 and 8 mols of the ethylene oxide to 1 mol of the alkyl phenol. The reaction products have the general formula

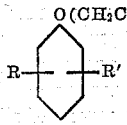

where R is hydrogen or an alkyl radical, R′ is an alkyl radical, the total carbon atom content of R and R' being 6 to 18 carbon atoms, and $n$ is an integer of 2 to 8. The preferred compounds are those in whch R is hydrogen, R' is a normal alkyl radical containing 6 to 12 carbon atoms and $n$ is 3 to 7. Compounds which are particularly suitable are obtainable from the Jefferson Chemical Company, Inc., New York City, New York, under the names Surfonic N–40 and Surfonic N–60. These compounds have the formulas $C_9H_{19} \cdot C_6H_4 \cdot O(CH_2CH_2O)_4H$ and $C_9H_{19} \cdot C_6H_4 \cdot O(CH_2CH_2O)_6H$, respectively.

Lubricating oils which may be used in the preparation of the greases of this invention include mineral lubricating oils as well as synthetic ester-type lubricating oils. Such ester oils are well known in the art and are prepared by reacting sebacic acid or other similar dibasic carboxylic acid with a monohydroxy aliphatic alcohol such as for example 2-ethyl hexyl alcohol. The mineral lubricating oils may be of the naphthenic or paraffinic type and will include low viscosity oils such as gas oil up to and including bright stocks, cylinder stocks and the like. Generally the lubricating oils ranging from an SAE grade of 10 to 60 are employed in grease making operations and these are particularly suitable here.

The greases of this invention are prepared by combining lubricating oil, alkyl aryl polyether alcohol and finely divided silica and/or alumina with mixing, or preferably with milling, and subsequently heating the product with mixing to a temperature such as has been indicated hereinabove. The order of addition of the thickening agent and the waterproofing agent is not important since substantially the same product having the same characteristics is obtained regardless of which material is added first to the lubricating oil. It is essential that the finely divided silica and/or alumina be well dispersed and this is most readily accomplished by milling, using an ordinary paint mill, colloid mill or equivalent milling device. The dispersion of thickening agent in the lubricating oil or in the lubricating oil containing the waterproofing agent is readily accomplished at room temperature, although if a product having a heavy grease body is desired it is sometimes advantageous to effect the dispersion at somewhat elevated temperatures. Moreover, if the waterproofing agent is to be added subsequent to the dispersion of thickening agent in the oil, this is readily accomplished at ordinary temperatures although somewhat elevated temperatures may again be used if desired. In any event, prior to complete dispersion, temperatures are preferably maintained below about 200–212° F.

Following the incorporation of both the thickening agent and the waterproofing agent, the mixture is heated with stirring or with paddle agitation in a grease kettle to a temperature of at least 250° F. and preferably at least 300–325° F. Temperatures above 350° F. are not needed to accomplish the desired effect. The grease is then cooled with continued agitation and is ready for packaging.

The amount of thickening agent, i.e. finely divided silica and/or alumina, to be used in preparing the greases of this invention will be between about 3% and about 30% by weight of the finished grease and preferably between about 5% and about 20% by weight of the grease, depending upon the consistency of the grease which is to be produced. The amount of alkyl aryl polyether alcohol to be employed will be between about 0.1% and about 10% by weight of the finished grease, and preferably between about 0.5% and about 7% by weight of the grease. In general the amount of the alkyl aryl polyether alcohol to be used will depend upon the amount of silica and/or alumina employed. The smaller amounts of the waterproofing agent are used when the smaller amounts of thickening agent are used and the larger amounts of waterproofing agent are used when the larger amounts of thickening agent are employed. In most instances the weight ratio of powdered silica and/or alumina to alkyl aryl polyether alcohol in the grease will be between about 3 to 1 and about 30 to 1 and preferably between about 5 to 1 and about 20 to 1.

As would be understood by one skilled in the art the greases of this invention may be prepared with or without the incorporation of oxidation inhibitors. Such inhibitors for use in greases are well known and need not be described. They may be incorporated in the grease at any stage of its preparation.

In the following examples the penetrations are all determined at 77° F. by the ASTM method. Moreover, the boiling water test involves placing approximately 1 cubic centimeter of the grease in a beaker of boiling water for 15 minutes and determining the water resistance visually. All compositions are set forth in parts by weight.

These examples are illustrative of the invention and are not to be considered as limiting the scope of the invention.

*Example I*

A grease is prepared from the following ingredients:

9 parts colloidal silica (Cab-O-Sil)
1 part $C_9H_{19} \cdot C_6H_4 \cdot O(CH_2CH_2O)_4H$
90 parts mineral lubricating oil The mineral lubricating oil is a paraffinic lubricating oil having a V.I. of 86 and a viscosity at 210° F. of 52.5 SSU.

The silica and oil are mixed on a steel plate with a spatula and the waterproofing agent added and mixing continued. The cold mixture is then heated to 325° F. over a period of 10 minutes and then cooled with working. The product has good grease structure, an ASTM penetration of 275 at 77° F. and shows essentially no breakdown or tendency to emulsify in the boiling water test. A sample of this grease heated again to 325° F. and cooled without spatula working has an unworked penetration of 250 and a worked penetration of 275. Another sample of this product heated to 325° F. and spatula worked has a penetration of 275 at 77° F. and after standing for 2 weeks the unworked and worked penetrations are 245 and 250, respectively.

*Example II*

For purposes of comparison, Example I is repeated with the exception that the alkyl aryl polyether alcohol is omitted. This product has an ASTM penetration of 240. In the boiling water test the grease breaks down completely in about 5 minutes.

A sample of this grease heated again to 325° F. and cooled without spatula working has unworked and worked penetrations of 235 and 240, respectively. Another sample of the grease heated to 325° F. and spatula worked while cooling has a penetration of 240 and after standing 2 weeks the unworked and worked penetrations are 230 and 235, respectively.

*Example III*

A grease is prepared from the following ingredients:

10 parts colloidal silica (Cab-O-Sil)
2 parts $C_9H_{19} \cdot C_6H_5 \cdot O(CH_2CH_2O)_6H$
88 parts mineral lubricating oil of Example I The three ingredients are mixed on a steel plate with a spatula. The resulting product is heated to 325° F. and cooled with working. The product shows essentially no breakdown in the boiling water test after 15 minutes.

*Example IV*

Example I is repeated using a waterproofing agent having the formula $C_6H_{13} \cdot C_6H_4 \cdot O(CH_2CH_2O)_2H$ in place of the compound shown in that example. The product is similar in characteristics to that of Example I.

*Example V*

Example I is repeated using a silica aerogel having a specific surface area of about 157 square meters per gram in place of the colloidal silica. The product is similar to that of Example I. It is resistant to boiling water and has a penetration of 280.

*Example VI*

Example I is repeated using a paint mill to disperse the thickening agent in the oil. The product is similar to that of Example I although it has a somewhat lower penetration, i.e. 255 at 77° F.

*Example VII*

Example I is repeated using a synthetic ester type lubricating oil, prepared by esterifying sebacic acid with 2-ethyl hexanol, in place of the mineral lubricating oil. The synthetic oil has a viscosity at 100° F. of 68.6 SSU and a viscosity index of 150.

The grease produced shows good resistance to boiling water and has unworked and worked penetrations of 280 and 322, respectively.

*Example VIII*

A grease is prepared from the following ingredients:

20 parts silica aerogel
5 parts $C_9H_{19} \cdot C_6H_5 \cdot O(CH_2CH_2O)_4H$
75 parts SAE 30 paraffinic mineral lubricating oil The waterproofing compound is dissolved in the mineral lubricating oil and to this solution is added the silica aerogel having a specific surface area of about 157 square meters per gram. After the mass is mixed it is passed through a paint mill to effect good dispersion. The milled product is placed in a grease kettle where it is heated, with agitation, to a temperature of 300° F. and then cooled.

This product shows no breakdown in the boiling water test and it has excellent reversibility characteristics.

*Example IX*

Example VIII is repeated using a mixture of equal parts by weight of finely divided colloidal silica as used in Example I and the silica aerogal used in Example VIII, a total of 20 parts of the thickening agent being used. The resulting grease is substantially the same as that of Example VIII.

*Example X*

A grease is prepared following the procedure of Example VIII using the following ingredients:

15 parts colloidal silica (Cab-O-Sil)
3 parts $C_{16}H_{33} \cdot C_6H_4 \cdot O(CH_2CH_2O)_{10}H$
82 parts SAE 20 paraffinic lubricating oil The resulting grease is water resistant and has good reversibility characteristics.

*Example XI*

Example X is repeated substituting a compound of the formula

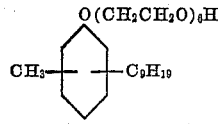

for the waterproofing agent used in that example.

The resulting grease is reversible and has excellent water resistance.

The above description and examples are illustrative of the invention but are not to be considered as limiting as variations may be made by one skilled in the art without departing from the spirit or the scope of the following claims.

I claim:

1. A water-resistant grease consisting essentially of lubricating oil of the class consisting of mineral lubricating oil and synthetic ester lubricating oil prepared by reacting a dicarboxylic acid with a monohydric alcohol containing thickening proportions of a finely divided thickening agent of the class consisting of silica and alumina and a small amount of a compound having the formula

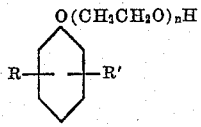

in which R is a radical of the class consisting of hydrogen and alkyl radicals, R' is an alkyl radical, the total carbon atom content of R and R' being 6 to 18 carbon atoms, and $n$ is an integer of 2 to 8, said grease being heated to a temperature between about 250° F. and about 325° F., said small amount being an amount sufficient to impart water-resistance to said heated grease.

2. A water-resistant grease consisting essentially of lubricating oil of the class consisting of mineral lubricating oil and synthetic ester lubricating oil prepared by reacting a dicarboxylic acid with a monohydric alcohol containing between about 3% and about 30%, based on the grease, of a finely divided thickening agent of the class of silica and alumina, and small amounts, between about 0.1% and about 10% by weight of the grease of an alkyl aryl polyether alcohol of the formula

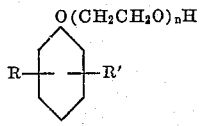

in which R is a radical of the class consisting of hydrogen and alkyl radicals, R' is an alkyl radical, the total carbon atom content of R and R' being 6 to 18 carbon atoms, and $n$ is an integer of 2 to 8, the resulting grease containing said alkyl aryl polyether alcohol being heated to a temperature between about 250° F. and about 325° F. to impart water-resistance to said grease.

3. A grease according to claim 2 in which said thickening agent has a specific surface area greater than 10 and less than 500 square meters per gram.

4. A grease according to claim 2 in which said thickening agent is a colloidal silica having a specific surface area between 25 and 500 square meters per gram.

5. A grease according to claim 2 in which R in the formula represents hydrogen and R' represents an alkyl radical of 6 to 12 carbon atoms.

6. A grease according to claim 2 in which said alkyl aryl polyether alcohol has the formula $$C_9H_{19} \cdot C_6H_4 \cdot O(CH_2CH_2O)_4H.$$

7. A grease according to claim 2 in which said lubricating oil is a mineral lubricating oil.

8. A grease according to claim 2 in which said lubricating oil is a synthetic ester type lubricating oil prepared by reacting a dicarboxylic acid with a monohydric alcohol.

9. A grease according to claim 2 in which said thickening agent is a mixture of finely divided silica and alumina.

10. A method of preparing a lubricating grease which comprises mixing a lubricating oil of the class consisting of mineral lubricating oil and synthetic ester lubricating oil prepared by reacting a dicarboxylic acid with a monohydric alcohol, 3% to 30% by weight based on the grease of a finely divided thickening agent of the class consisting of silica and alumina, and 0.1% to 10% by weight based on the grease of a compound of the formula

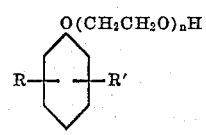

in which R is a radical of the class consisting of hydrogen and alkyl radicals, R' is an alkyl radical, the total carbon atom content of R and R' being between 6 and 18 carbon atoms, and $n$ is an integer of 2 to 8, heating the mixture to a temperature of at least 250° F. to impart water-resistance characteristics to said grease.

11. A method according to claim 10 in which said thickening agent is first milled into the lubricating oil, said compound then being added to the thickened oil.

12. A method according to claim 10 in which said compound is first dissolved in said lubricating oil and the thickening agent is mixed into the oil containing said compound by means of milling.

13. A method according to claim 10 in which said mixture of oil, thickening agent and compound is heated with mixing to a temperature in the range of 300°–350° F.

14. A method according to claim 10 in which said lubricating oil is a mineral lubricating oil.

15. A method according to claim 10 in which said lubricating oil is a synthetic ester type lubricating oil prepared by reacting a dicarboxylic acid with a monohydric alcohol.

16. A method according to claim 10 in which said thickening agent is a finely divided silica having a specific surface area of 25 to 500 square meters per gram.

17. A method according to claim 10 in which R in the formula represents hydrogen, R' represents an alkyl group of 6 to 12 carbon atoms and $n$ represents an integer of 3 to 7.

References Cited in the file of this patent

UNITED STATES PATENTS

| | | |
|---|---|---|
| 2,573,650 | Peterson | Oct. 30, 1951 |
| 2,652,365 | Moore et al. | Sept. 15, 1953 |
| 2,680,095 | Hotten | June 1, 1954 |
| 2,739,121 | Weihe et al. | Mar. 20, 1956 |
| 2,766,209 | Marshall | Oct. 9, 1956 |
| 2,891,010 | Martinek | June 16, 1959 |

OTHER REFERENCES

"Lubricating Greases," by Boner, pages 705–706, Reinhold Pub. Corp., New York, N.Y. (1954).